Oct. 8, 1968  A. R. MacPHERSON ET AL  3,404,846
AUTOGENOUS GRINDING MILL
Original Filed Oct. 9, 1962  8 Sheets-Sheet 1

INVENTORS.
ARTHUR R. MAC PHERSON
GUY L. SAUNDERS
ROBERT C. MEADERS
BY
Parker & Carter
ATTORNEYS.

"a" SLOW

"b" MEDIUM

"c" FAST

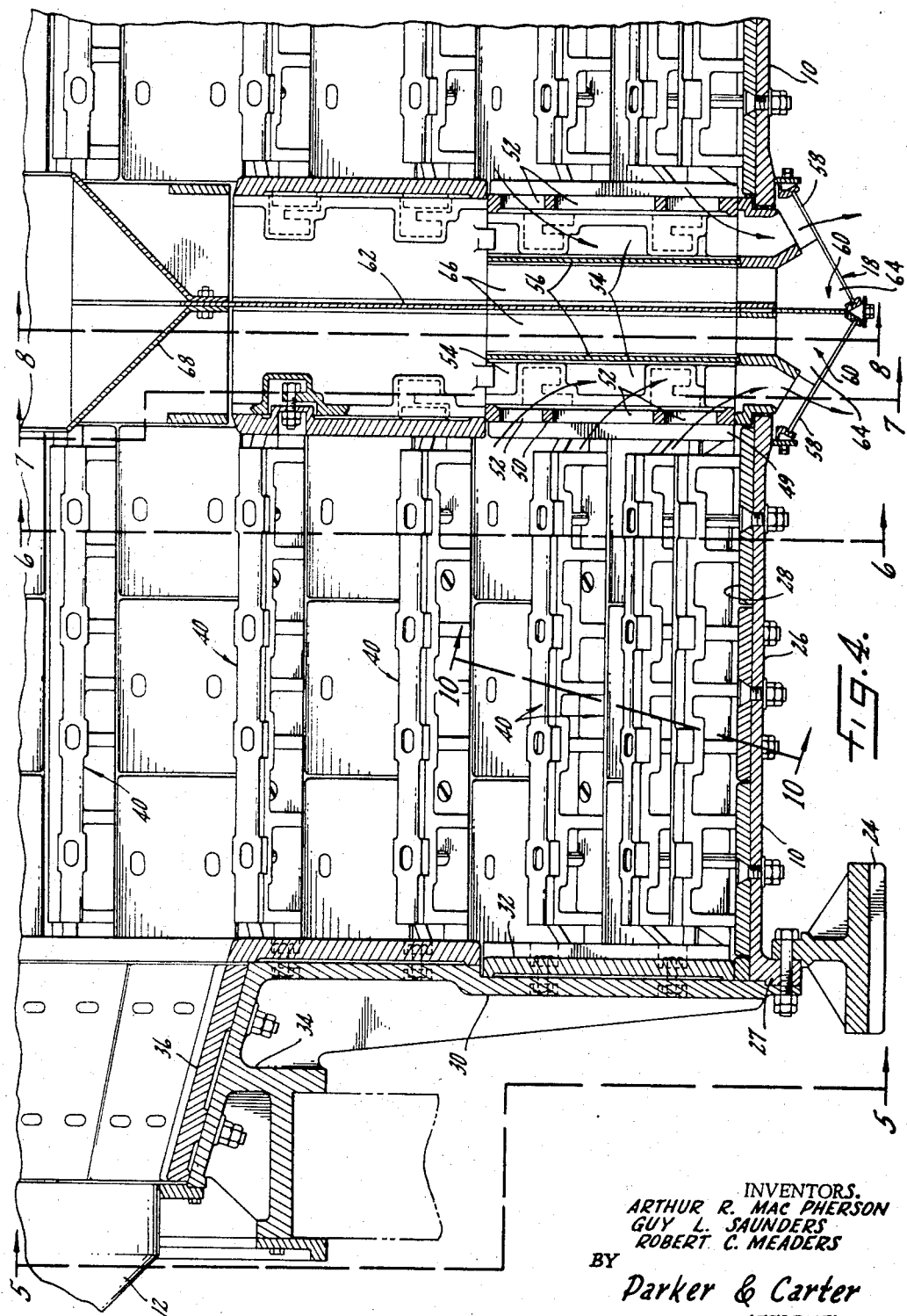

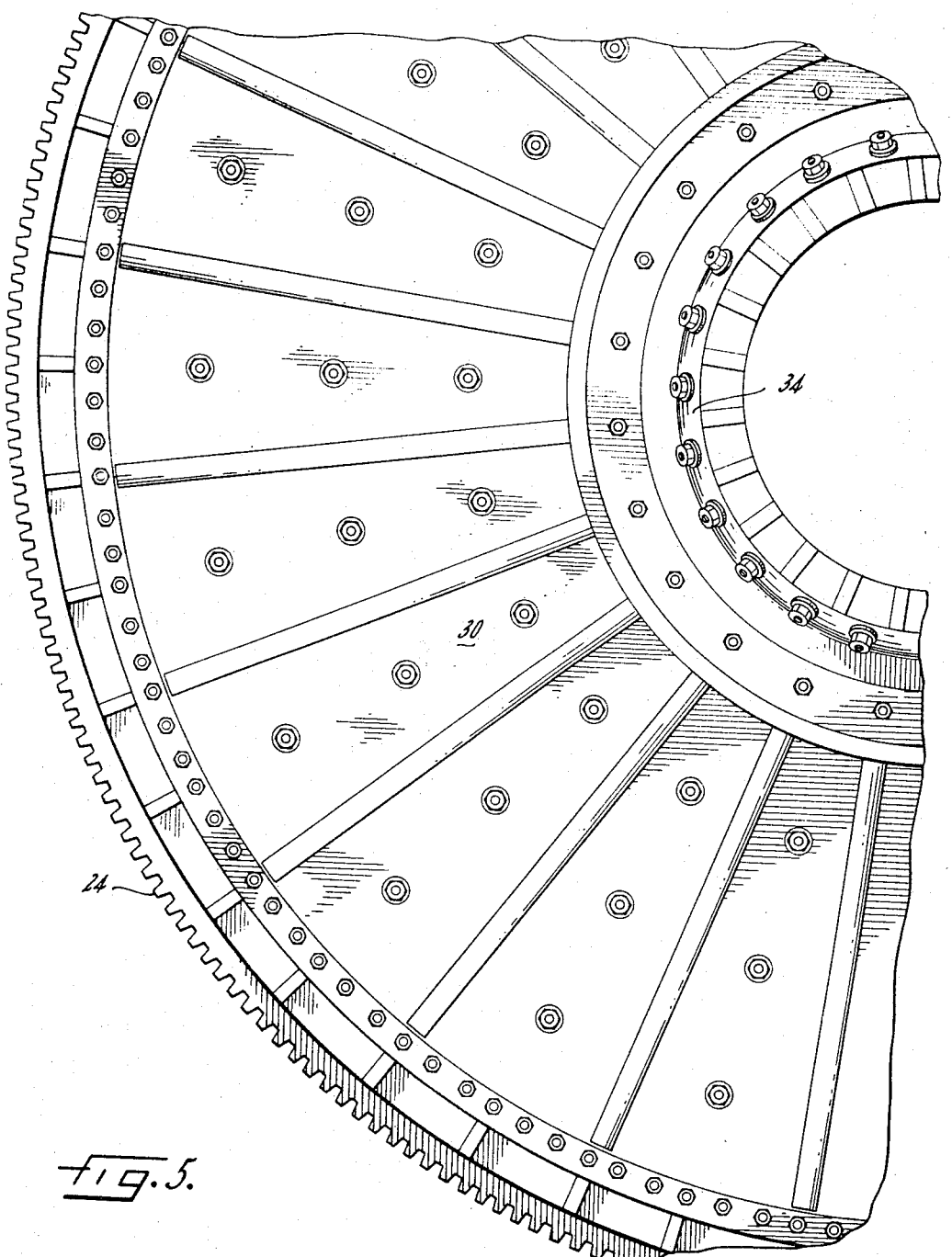

Oct. 8, 1968    A. R. MacPHERSON ET AL    3,404,846
AUTOGENOUS GRINDING MILL
Original Filed Oct. 9, 1962    8 Sheets-Sheet 8
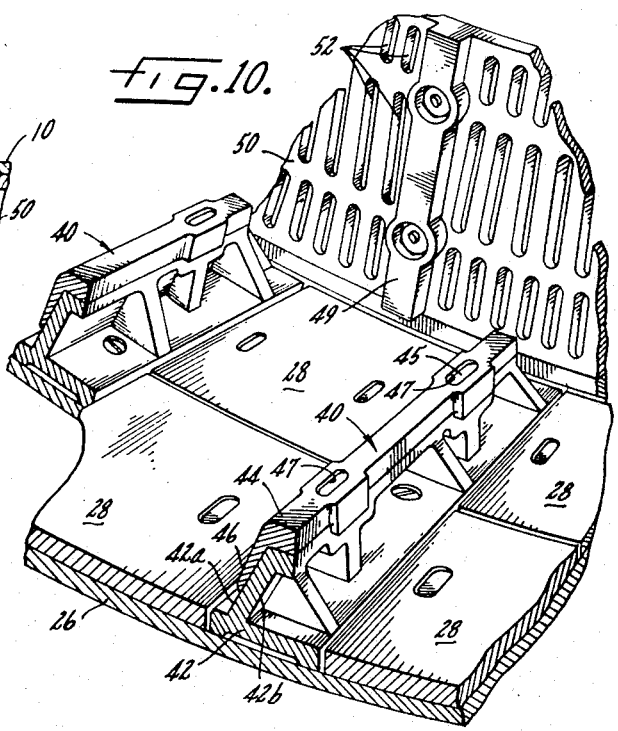
fig.10.
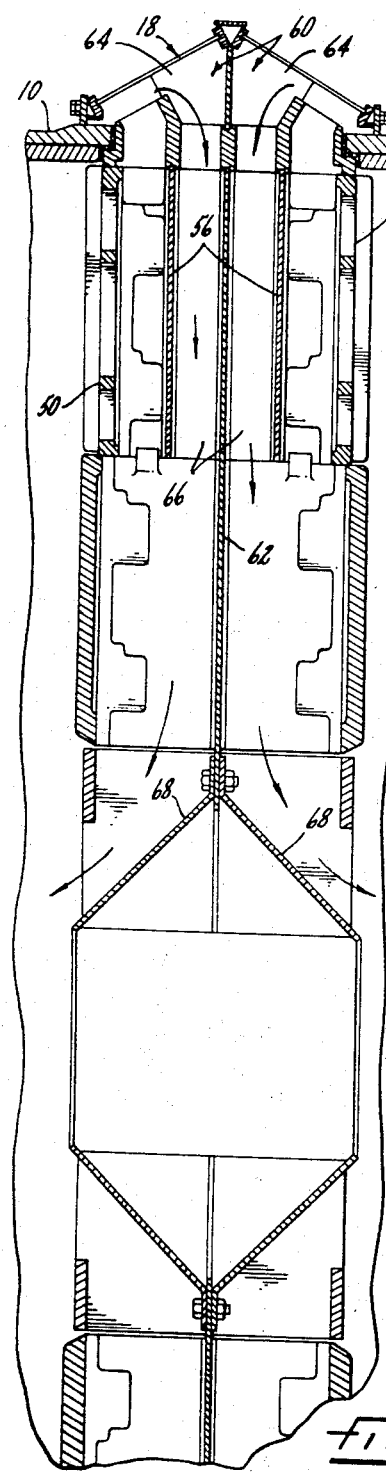
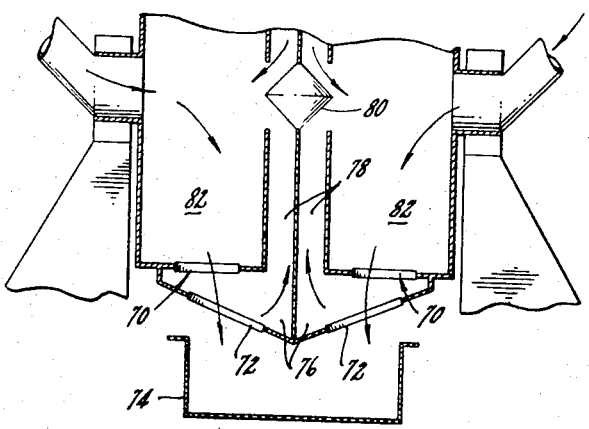
fig.11.
fig.9.
INVENTORS.
ARTHUR R. MAC PHERSON
GUY L. SAUNDERS
ROBERT C. MEADERS
BY
Parker & Carter
ATTORNEYS.

United States Patent Office

3,404,846
Patented Oct. 8, 1968

---

3,404,846
AUTOGENOUS GRINDING MILL
Arthur R. MacPherson and Guy L. Saunders, Toronto, Ontario, Canada, and Robert C. Meaders, Milwaukee, Wis., assignors to Nordberg Manufacturing Company, Milwaukee, Wis., a corporation of Wisconsin
Original application Oct. 9, 1962, Ser. No. 229,334, now Patent No. 3,206,128, dated Sept. 14, 1965. Divided and this application Feb. 24, 1964, Ser. No. 352,710
14 Claims. (Cl. 241—72)

This application is a division of copending application Ser. No. 229,334, filed Oct. 9, 1962, now Patent No. 3,206,128 granted Sept. 14, 1965.

This invention relates to apparatus for autogenous grinding.

A primary purpose of the invention is a grinding mill which will accept run of mine size rock and reduce it to a sand or slime through the impact and attrition of the rock itself.

Another purpose is a grinding mill of the type described having internal means for screening out the fine product and recirculating a circulating load of oversize back into the grinding chambers.

Another purpose is a grinding mill of the type described including means for internal separation of the finely ground product.

Another purpose is a grinding mill of the type described having a pair of grinding chambers, although a single chamber is also satisfactory.

Another purpose is an autogenous grinding mill having a peripheral discharge.

Another purpose is a mill for autogenous grinding utilizing spaced lifter bars within the mill, the height and spacing of the lifter bars being regulated to obtain maximum grinding efficiency.

Another purpose is an autogenous grinding mill utilizing spaced lifter bars about the periphery of the mill, the lifter bars having a replaceable wear part.

Another purpose is the subjection of the fallen particles to an additional arcuately directed impact, as by the lifter bars.

Other purposes will appear in the ensuing specification, drawings and claims.

The invention is illustrated diagrammatically in the accompanying drawings wherein:

FIGURE 4 is a partial axial half section, on an enlarged scale, illustrating the inside of the mill of FIGURE 1;

FIGURE 5 is a section along plane 5—5 of FIGURE 4;

FIGURE 9 is a partial horizontal section, on an enlarged scale, illustrating the means for recirculating the rock within the mill;

FIGURE 10 is a perspective taken along plane 10—10 of FIGURE 4; and

FIGURE 11 is a diagrammatic illustration of a variant form of discharge arrangement.

Autogenous grinding is defined as a system of grinding in which run of mine or coarsely crushed rock is fed directly to the mill which discharges a finished ground sand or slime product. This is to be contrasted with ball mills and pebble mills where sized steel balls or selected and sized pebbles or rock are added to the mill which is fed with finely crushed rock or ground rock from a previous stage of grinding, and which discharges a finished ground sand or slime product.

Figure 1:
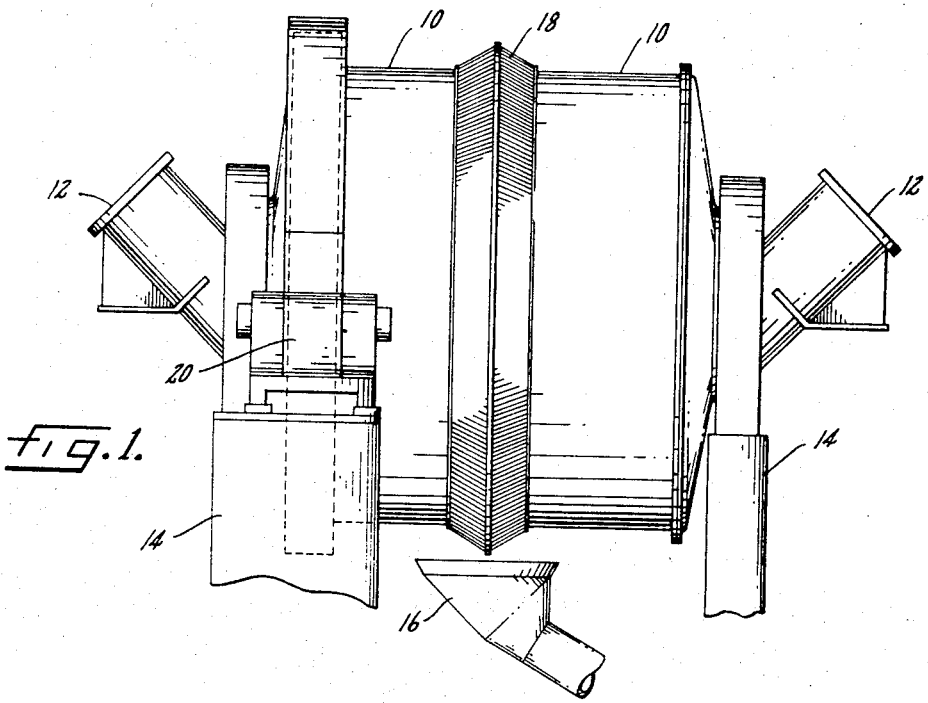
FIGURE 1 is a side view of a grinding mill of the type described.

As shown in FIGURE 1, the mill may include a pair of grinding chambers 10 each having a material inlet 12. The mill is supported by a foundation arrangement 14 and the finished product may be discharged into a hopper 16 from a screen arrangement 18 located at the junction of the two chambers 10.

Figure 2:
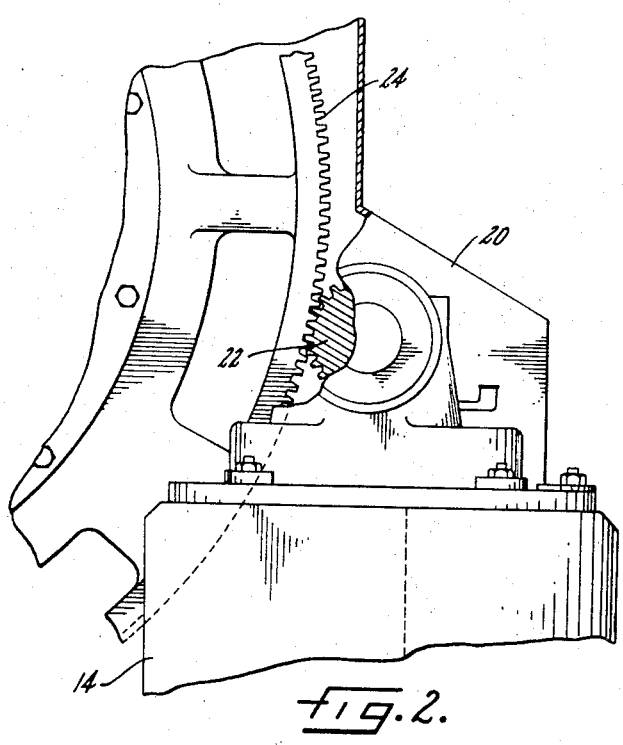
FIGURE 2 is an enlarged vertical section through the mill of FIGURE 1, illustrating the drive arrangement.

The mill may be driven by a suitable motor or the like positioned within a housing 20 and driving a pinion 22 illustrated in FIGURE 2. The pinion 22 is in mesh with and drives a large ring gear 24 which is on one end of the mill. Preferably there is a single drive for both mill chambers as, in effect, the two chambers form a single mill. The particular type of mill drive is not important and many variations in the drive may be equally satisfactory.

The rate of feed to the mill will normally be controlled so that there is maximum efficiency and optimum use of the mill. The control of the rate of feed forms no part of the present invention.

Figure 3A:
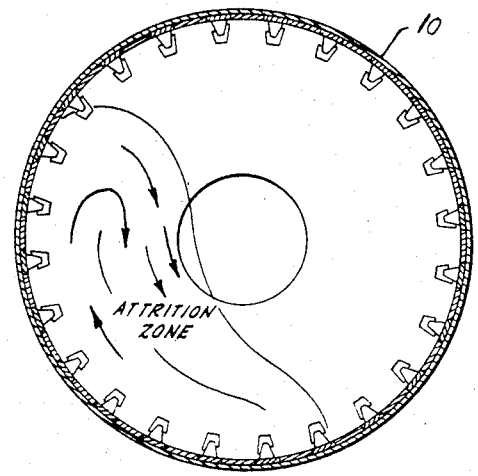
FIGURE 3 is a group of diagrammatic illustrations of the movement of the rock within the mill, *a* indicating the action at relatively slow speed of rotation, *b* at medium or desired speed, and *c* at unduly fast speed.
Figure 3B:
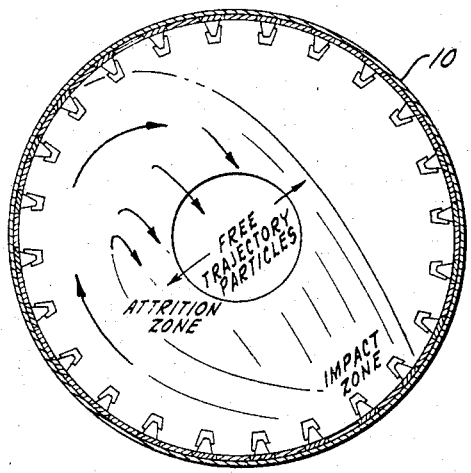

In considering the operation of the mill, as shown, for example, in FIGURE 3, there is an optimum speed or range of speeds, in relation to any particular size of mill, at which the desired effect is obtained. With reference, for example, to the preferred operation, consider the example of a mill having a peripheral speed of the order of 600 feet per minute. Consider that the particles being carried about the interior of the mill at that speed are, in the upper arc of the mill path, actually thrown or projected laterally. This, in practice, is a trajectorial flight free of interference from other particles which terminates in impact on the mill shell or other particles. That is to say that the combined effect of the lateral projection or initial velocity and gravity is to cause the more or less scattered particles to take the path diagrammatically shown at FIGURE 3b, or something similar to it. When the particles strike at the end of their trajectory they are traveling with substantially their initial speed, and their path at the point of strike is substantially perpendicular to the particles or to the mill interior which they strike. The effect will not be obtained if the particles are moving in a mass. The particles are actually thrown in the clear and travel as scattered particles and not as a mass, until the particles strike the inside of the mill or the material being carried along by the mill liner. This is followed by lateral or arcuate impacting imparted by the lifter bars.

If the mill runs too slowly then cascading may take place, which, of course, destroys the desired method. There will then be little impacting. This condition is diagrammatically illustrated in FIGURE 3a. On the other hand, if the mill is accelerated too fast then the path diagrammatically indicated as 3c may be typical, and the particles will strike the mill linear and the mass of material in the mill generally tangentially. Our method, therefore, is obtained, in any particular mill or mill size, by relating the peripheral speed of the mill and the height of the lifter bars on the shell or mill liner.

While the above-described trajectorial flight, followed by lateral impact, is an important feature of the method, and a very effective component of the treatment to which the particles are subjected in the mill, it should be kept in mind that there is always some of the mass which tumbles and abrades, particle against particle. The maintenance of this tumbling mass results in a substantial attritional reduction of the particles which form it. In other words, in the mill and method, reduction by impact and reduction by attrition are both taking place. It would be impossible to establish a rigid differentiation between the various reduction effects. However, the particles undergoing reduction are, to varying degrees, being reduced by attrition, being reduced by impact and, in a broad sense, by the combination of impact and attrition. The end result is a very efficient reduction of the feed to the desired product.

The mill details are illustrated in FIGURES 4–10. As each of the chambers 10 are substantially identical, only one will be described in detail. Each chamber has an outer shell 26 within which are wear plates 28. The shell 26 may have a flange 27 mounting the ring gear 24. The ends of the chambers 10 may be formed by end plates 30. Bolted within the plates 30 are suitable wear plates 32. The end plates 30 may be integral with a trunnion 34 or they may be separate and bolted to the trunnion. The interior of the trunnion may have wear plates 36. The construction of the mill shell may be conventional and is not important.

Figure 6:
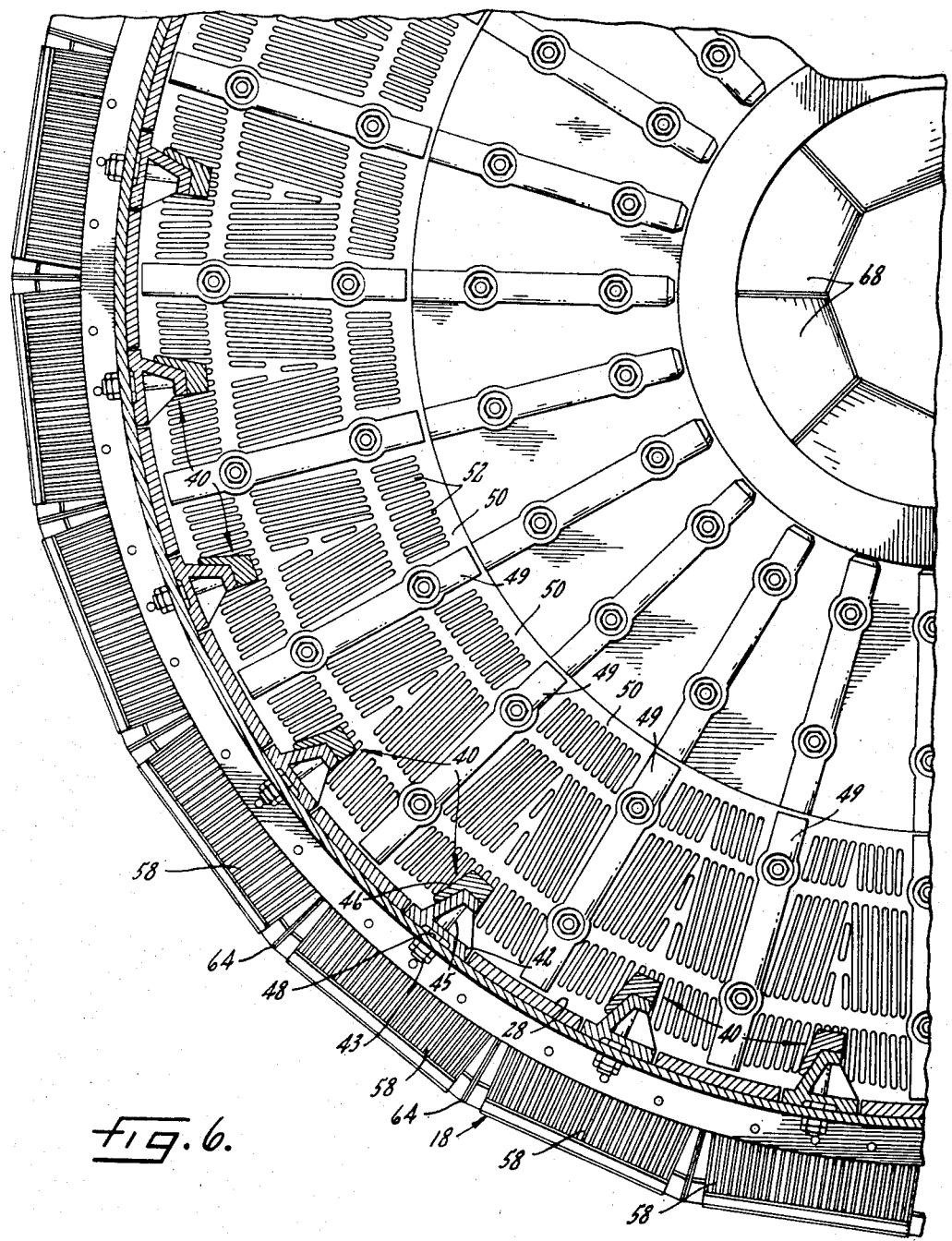
FIGURE 6 is a section along plane 6—6 of FIGURE 4.
Figure 7:
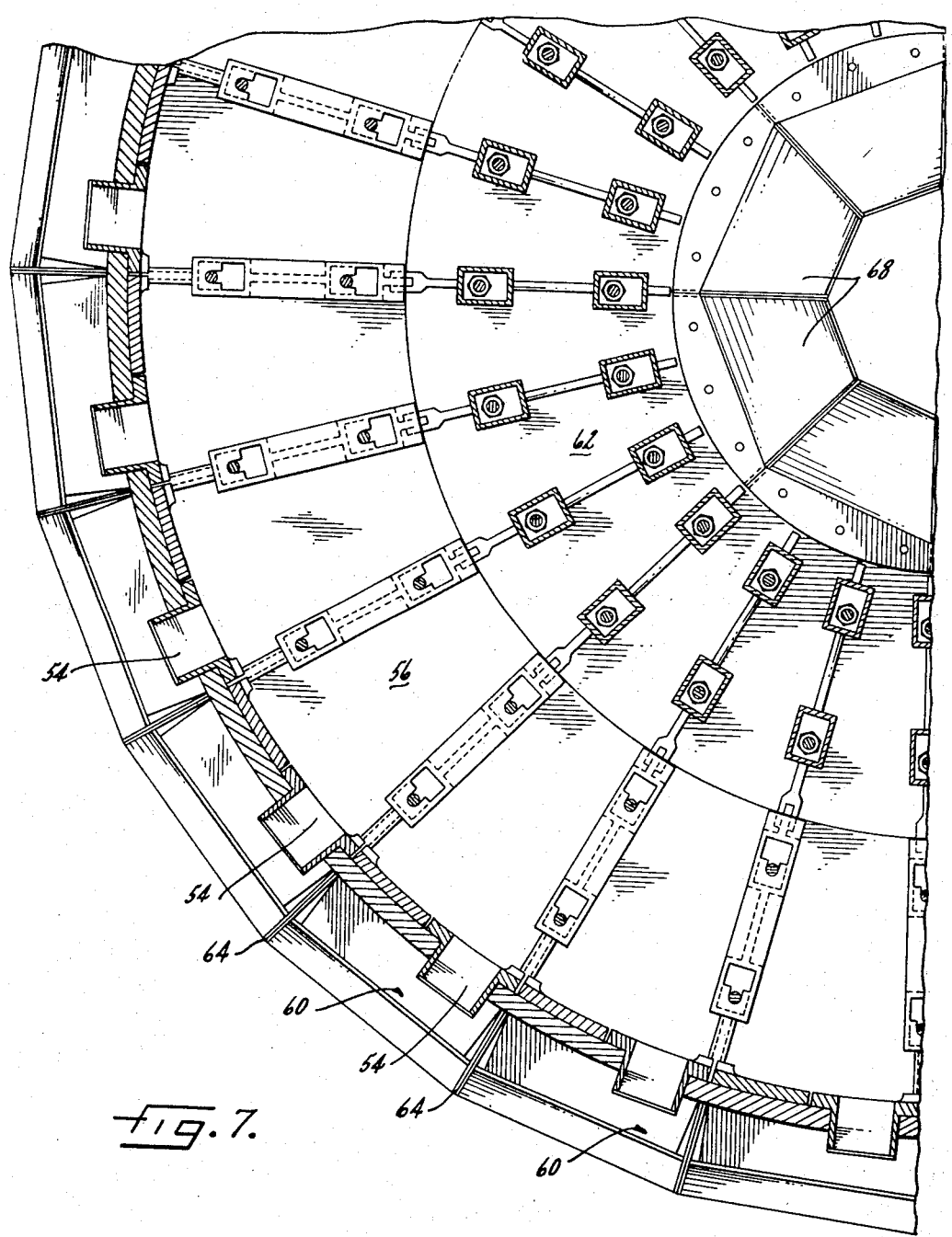
FIGURE 7 is a section along plane 7—7 of FIGURE 4, with the screens removed.
Figure 8:
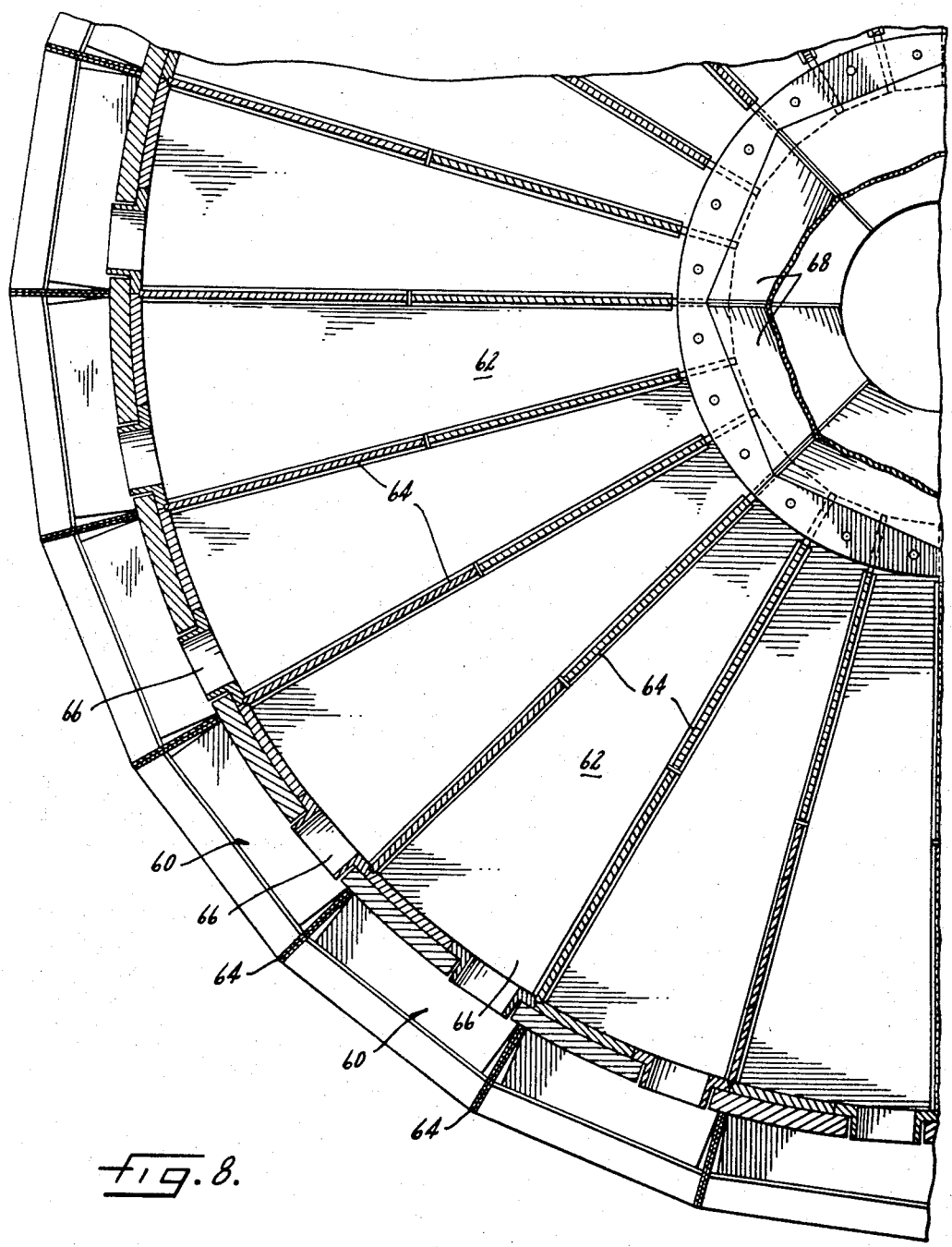
FIGURE 8 is a section along plane 8—8 of FIGURE 4, with the screens removed.

Within the chambers 10 are a plurality of axially extending circumferentially spaced lifter bars 40 illustrated particularly in FIGURES 6 and 10. Each of the lifter bars may include a base 42 having upwardly slanted walls 42a and 42b and mounting a wear member 44. The wear member may seat on top of the base and has a leading wear face 46 which extends downwardly to partially mask the leading face 42a of the base. The wear member 44 may have oval shaped openings 47 aligned with holes 48 to receive bolts 45 which extend outwardly through the mill shell, as at 43. The heads of the bolts 45 may be oval shaped and the bolts may be tightened and loosened from outside the mill shell. If the lifter bars are too low they have very little effect in moving the material up with the rotating shell and there is increasing slippage as the mill speed approaches critical speed. As the speed is increased toward critical speed there occurs an intermittent slippage in which the whole charge appears to be released from its lift for a very short time and then actually settles back. As this occurs the power on the mill motor drops drastically and almost instantaneously is again picked up as the charge resumes its normal motion. This slippage may occur every three or four seconds. This condition appears to increase the impact action of the mill, but the condition is so unstable and the liner wear is so high as to be highly unsatisfactory. The lifter bars need to be sufficiently high so that there is no intermittent slippage at any speed. The speed can then be regulated so that the maximum amount of material is released in free trajectory and so that the angle of fall is roughly at right angles to the shell.

In the carrying out of the method not only is the height of the lifter bars in relation to the peripheral speed of the mill important, but, also, the spacing between the lifter bars. The lifter bars must, for example, be spaced sufficiently apart to permit the particles to enter the cavity between the bars so that the particles will then be subjected to maximum lateral or peripheral impact by the bars. There must be a sufficient number of bars to prevent slippage of the mass undergoing elevation, and, also, to provide an adequate number of lateral impacts or blows per revolution against the falling mass.

It is preferred that the space-height relationship between the lifter bars be in a range of the order of from 3 to 1 to 4.5 to 1. This range is not to be taken too rigidly but it has, in practice, turned out to be practical, and is applicable to any normal size of mill. However, to carry out the method a minimum height of lifter is necessary, and the lifter must be something more than a mere roughening of the inner surface or lining of the mill. The probable minimum height for a mill of 5-foot diameter would be of the order of 3½ inches. It should be kept in mind that as the mill increases in diameter the peripheral speed also increases, even though it may be at the same percentage of the critical speed of a smaller diameter mill. This involves, of course, a different peripheral speed, stated in feet per minute, in different sizes of mill. It might, for example, be of the order of 460 feet per minute in a 6-foot diameter mill, whereas in an 18-foot mill the peripheral speed might be of the order of 770 feet per minute. Clearly, the radial height of the lifters varies with the size of the mill. In an 18-foot mill its radial height may be of the order of 8 to 10 inches. Regardless of changes in the size of the mill, the preferred space-height relationship of the lifter bars remains generally in the range above set out.

In any particular mill assume that the number of bars or lifters used is set or fixed. The individual permanent bars carry wearable components. These wearable components may be so designed or sized that when they are initially put in the mill and subjected to their first wear they represent the maximum, or approach the maximum, height of bar for the spacing of that mill. As they wear down, they wear down toward the minimum height. Before they wear through they are removed, but for the entire life of these removable bars they are within the desired or permissible range of relationship of height to spacing.

Another important limitation is the ratio between the length of each chamber and its diameter. Preferably the ratio of the interior diameter of the drum or shell and the interior length should not exceed approximately 3 to 1. A ratio of on the order of about 2.7 to 1 has been found to be very satisfactory. When the mill is too long, or has to great a length, the constraining effect of the ends of the mill on the charge is lost and there will be slippage in the central part of the charge. This material will not enter the trajectorial flight zone and will tend to tumble.

The center of the mill or the inside of each of the chambers 10 may include means for discharging the finished product and for recirculating a portion of the load. Considering FIGURES 4 and 9, the inside radial wall of each of the chambers 10 may be formed by a plurality of radially extending grates 50 held together by radial bars 49. The grates 50 have spaced radially extending openings or slots 52. The openings or slots 52 are of a sufficient size to pass material which is oversized as compared with the finished product. The material discharged through the openings 52 falls into an annular space 54 behind the grates 50 and in front of an annular plate 56. The material moves down through the space 54 toward the bottom, as shown in FIGURE 4, and, if the material has been ground or reduced to the desired size, it will fall out a bottom screen 58. The two annular screens 58 together form in effect a double conical screen 18, described in connection with FIGURE 1.

If the material has not been sufficiently reduced in size to pass through screen 58, it will slide down the screen toward the center of the mill and will collect in pockets 60 defined by a central wall 62 and by spaced radial plates 64. As the mill rotates this material will be carried around to the top and then will be discharged down through central passages 66, as illustrated in FIGURE 9. Each central passage 66 is defined on the outside by the annular wall 56 and on the inside by the annular wall 62, with radial plates 64 dividing the passages. The path of discharge is illustrated in FIGURES 4 and 9. The material will fall down the passages 66 and will then be directed back into the interior of the grinding chambers as it strikes the generally conical walls or directors 68.

FIGURE 11 illustrates a variant form of screening and separating arrangement for use with a mill of the type described. Instead of having the discharge grates in a radial position, the discharge grates are positioned about the outer periphery, as indicated at 70. The material may pass through the peripheral grates 70, which may be similar to the grates 50 illustrated and described above, and then pass through a peripheral screen 72. The material from the screen falls down into a trough or hopper 74. The material not screened will collect in the annular pocket 76 and be carried upwardly with the rotating mill. As the material reaches the top of the mill, it falls down through passages 78, and strikes the conical plates 80 which direct the material back into the grinding chambers 82.

If a portion of the discharged product still contains an oversized fraction, it can be separated and returned to the mill for regrinding.

The use, operation and function of the invention are as follows:

An autogenous grinding mill may receive a coarse run of mine rock feed and discharge it as a finished ground sand or slime product. In order to efficiently break down the rock the mill must provide both impact and attrition forces. In mills with substantially smooth linings and operating at sub-critical or super-critical speeds the power efficiency in grinding run of mine rock is very low. The only time efficiency can be obtained is when a fine product is fed to the mill with just enough coarse rock to act as a grinding media. This in effect is pebble milling and the power efficiency is still less than that of the present autogenous mill.

Figure 3C:
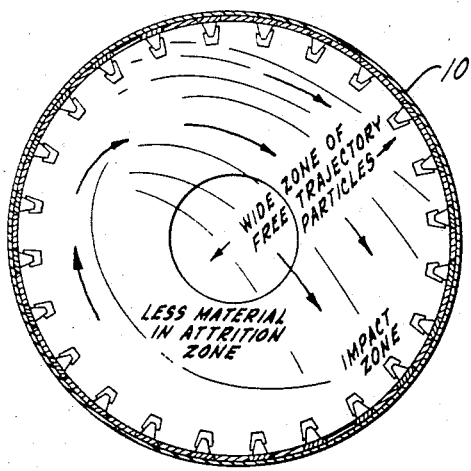

As soon as means are provided for imparting impact force into the charge the efficiency of grinding run of mine rock improves. The only means for imparting an impact force into the charge is by the use of outstanding bars on the shell of the mill which raise the rock up as the mill rotates. The spacing and height of the lifter bars is critical both in maximum production of the mill and in the improvement of power efficiency. Maximum efficiency is obtained when the descending material is allowed to have a trajectorial flight and is not carried too far over the top of the mill. Note FIGURES 3a, 3b and 3c. FIGURE 3b illustrates a trajectorial flight of the material when the mill is being run at the correct speed, which is on the order of about 72 percent to 80 percent of critical speed. When the mill operates too fast the material is carried too far. At the end of the trajectory the angle it makes on contact with the shell is reduced to the extent that the particle is traveling almost parallel to the direction of the shell on impact. The path of the material when the mill is moving too fast is indicated in FIGURE 3c. When the mill is moving too slow, as indicated by FIGURE 3a, the material merely slides, tumbles or rolls down upon the rock and there is no effective impact. In the ideal situation the freely traveling particle hits the shell, lifter bar or other rock at rest on the shell, and almost normal to the shell. When the freely traveling particle hits at right angles to the shell, the particle must come to rest, change direction approximately 90 degrees, and simultaneously go up to high speed. Thus two important impact blows are delivered, one by the particle upon initial contact with the shell and one by the lifter bar. This last impact is generally arcuate in direction. Thus the lifter bar must be high enough to impact the particles that have dropped in front of it and it must also be high enough to adequately lift and impart velocity to the particles.

It is the combination of impact and attrition which provides sufficient force to reduce the material to size.

The lifter bars will normally wear out during use and by having a separate and replaceable wear plate or wear face there will be a substantial savings in part replacement.

An important feature of the invention is the recirculation of particles which have not been ground down to discharge size. In practice it has proved highly advantageous to recirculate such oversize particles, and it has been found that by their recirculation there has been a significant power saving. Recirculation causes the intimate mixing through the charge of these particles of intermediate size. If the grate opening were restricted to prevent the passage of these particles of intermediate size they would form against the face of the grate, dam in the fine material, and cause an actual power wastage. This is not a matter of theory but of practical experience.

Whereas the preferred form of the invention has been shown and described herein, it should be realized that there are many modifications, substitutions and alterations thereto, within the scope of the following claims. For example, a variety of discharge means may be employed.

We claim:

1. A combined crushing and grinding mill in which the rock itself is used for grinding, comprising a generally horizontal rotatable drum having a cylindrical wall and two generally smooth vertical end walls, the ratio of the interior diameter of the drum and the interior length being of the order of 3 to 1, means for feeding coarse feed material into said mill, means for withdrawing the product from said mill, and a plurality of highly upstanding transverse impact and lifting elements extending generally radially inwardly from the wall, said elements being in a space height relationship of not less than 3 to 1 and not more than 4.5 to 1, and means for rotating the mill in the speed range of generally from 72 percent to 80 percent of critical speed.

2. The structure of claim 1 characterized by and including means for feeding liquid to the mill with the feed delivered to the mill.

3. A combined crushing and grinding mill in which the rock itself is used for grinding, comprising a generally horizontal rotatable drum having a cylindrical wall and two substantially smooth vertical walls, the ratio of the interior diameter of the drum and the interior length being of the order of 3 to 1, means for feeding coarse material into said mill, means for withdrawing the product from said mill, and a plurality of highly upstanding transverse impact and lifting elements extending generally radially inwardly from the cylindrical wall, said elements being of sufficient radial inward penetration in relation to the diameter of the mill positively to prevent slippage of the mass downwardly in relation to the vertical mill wall, and means for rotating the mill in the speed range of generally from 72 percent to 80 percent of critical speed and to thereby release the material for a trajectional flight downwardly across the axial zone of the mill, the impact and lifting elements being effective to impart impacts generally arcuately about the lower periphery of the zone of reduction of the mill against the particles which have received an impact at the end of their fall.

4. The structure of claim 3 characterized by and including screening means, rotatable with the mill, for screening out the fines through a size range substantially exceeding that of the end product.

5. The structure of claim 3 characterized by and including screening means rotatable with the mill, for screening out the fines through a size range substantially exceeding that of the end product, and further characterized by means for returning to the mill for reduction the oversize from said screening means.

6. A multi-chambered combined crushing and grinding mill in which the rock itself is used for grinding, comprising a generally horizontal rotatable drum having a cylindrical wall and two substantially smooth vertical walls for each chamber, the ratio of the interior dimeter of the drum and the interior length of each chamber being of the order of 3 to 1, means for feeding coarse material into said mill chambers, means for withdrawing the product from said chambers, and a plurality of highly upstanding transverse impact and lifting elements extending generally radially inwardly from the wall of each chamber, said elements being of sufficient radial inward penetration in relation to the diameter of the mill positively to prevent slippage of the mass downwardly in relation to the mill wall, and means for rotating the mill in the speed range of generally from 72 percent to 80 percent of critical speed and to thereby release the material in each chamber for a trajectorial flight downwardly across the axial zone of the mill, the impact and lifting elements being effective to impart impacts generally arcuately about the lower periphery of each chamber of the mill against the particles which have received an impact at the end of their fall.

7. The structure of claim 6 characterized by and including screening means rotatable with the mill for screening out the fines to a size range substantially exceeding that of the end product, said screening means being located at the adjacent ends of each pair of chambers.

8. The structure of claim 6 characterized by and including screening means rotatable with the mill for screening out the fines to a size range substantially exceeding that of the end product, said screening means being located, at least in part, between the adjacent ends of each pair of chambers.

9. The structure of claim 6 characterized by and including screening means rotatable with the mill for screening out the fines to a size range substantially exceeding that of the end product, said screening means being located at the adjacent ends of each pair of chambers, and further including means located between the ends of such chambers for returning to the chambers, for reduction, the oversize from said screening means.

10. A combined crushing and grinding mill in which the rock itself is used for grinding, comprising a generally horizontal rotatable drum structure having cylindrical walls, said drum structure having end walls and a pair of spaced intermediate walls, whereby the space within the drum is divided into two working chambers, the end walls being apertured generally axially, means for feeding the material to be treated generally axially through the end walls, the intermediate walls, each of which serves as an end wall for one of the working chambers, being apertured adjacent their peripheries to permit the escape of treated material, and being also apertured generally axially, screening means rotatable with the drum for permitting the escape of all particles below a predetermined size, said screening means being in communication with the space between the intermediate walls, and return means rotatable with the drum and positioned between said intermediate walls and adapted to receive the over-size and to return it, in response to the rotation of the drum, toward the axis of the drum and generally axially into the interiors of the two working chambers.

11. The structure of claim 10 characterized by and including a partition in the space between the intermediate walls whereby to separate the material to be returned to the individual working chambers.

12. The structure of claim 10 characterized by the provision of generally radially extending vanes defining generally radial passages extending from the screening means toward the axis of the mill.

13. The structure of claim 12 further characterized by a generally conic deflector means surrounding the axis of the mill and formed and adapted to direct material by gravity through the adjacent intermediate walls.

14. The structure of claim 12 further characterized in that the screening means includes screening elements inclined outwardly in relation to the cylindrical walls of the drum.

References Cited
UNITED STATES PATENTS

| | | | |
|---|---|---|---|
| 1,137,878 | 5/1915 | Marcy | 241—70 X |
| 1,368,739 | 2/1921 | Lindhard | 241—70 X |
| 1,513,952 | 11/1924 | Apted | 241—71 |
| 1,670,005 | 5/1928 | Pratt | 241—70 X |
| 1,787,788 | 1/1931 | Kueneman | 241—70 X |
| 1,902,413 | 3/1933 | Miller | 241—70 X |
| 2,398,989 | 4/1946 | Agthe | 241—70 |
| 2,555,171 | 5/1951 | Weston | 241—183 |
| 2,566,103 | 8/1951 | Weston | 241—183 X |
| 2,704,636 | 3/1955 | Weston | 241—183 |
| 3,078,049 | 2/1963 | Hardinge | 241—26 |
| 2,670,139 | 2/1954 | Treshow | 241—70 |
| 3,231,203 | 1/1966 | Hardinge | 241—70 X |

WILLIAM S. LAWSON, *Primary Examiner.*

ROBERT C. RIORDON, *Examiner.*

H. F. PEPPER, JR., *Assistant Examiner.*